US011106380B2

(12) United States Patent
Wu et al.

(10) Patent No.: US 11,106,380 B2
(45) Date of Patent: Aug. 31, 2021

(54) MIGRATION OF STORAGE FOR WORKLOADS BETWEEN DESKTOP AND CLOUD ENVIRONMENTS

(71) Applicant: VMware, Inc., Palo Alto, CA (US)

(72) Inventors: Junfei Wu, Beijing (CN); Zongmin Li, Beijing (CN); Qi Kang, Beijing (CN); Haisheng Kang, Beijing (CN); Jinhua Chen, Beijing (CN)

(73) Assignee: VMware, Inc., Pato Alto, CA (US)

( * ) Notice: Subject to any disclaimer, the term of this patent is extended or adjusted under 35 U.S.C. 154(b) by 0 days.

(21) Appl. No.: 16/688,865

(22) Filed: Nov. 19, 2019

(65) Prior Publication Data
US 2021/0149577 A1    May 20, 2021

(51) Int. Cl.
*G06F 3/06* (2006.01)
*G06F 9/455* (2018.01)

(52) U.S. Cl.
CPC ............ *G06F 3/0647* (2013.01); *G06F 3/067* (2013.01); *G06F 3/0617* (2013.01); *G06F 3/0664* (2013.01); *G06F 9/45558* (2013.01); *G06F 2009/4557* (2013.01); *G06F 2009/45595* (2013.01)

(58) Field of Classification Search
CPC ............. G06F 12/0804; G06F 11/1446; G06F 2201/815; G06F 11/1484; G06F 2212/1032
See application file for complete search history.

(56) References Cited

U.S. PATENT DOCUMENTS

| 8,117,168 | B1* | 2/2012 | Stringham | .......... G06F 11/1451 707/646 |
| 2015/0278046 | A1* | 10/2015 | Zellermayer | ....... G06F 11/1484 714/4.11 |
| 2017/0344292 | A1 | 11/2017 | Sterin et al. | |
| 2019/0065323 | A1* | 2/2019 | Dhamdhere | ............ G06F 9/455 |
| 2019/0324786 | A1* | 10/2019 | Ranjan | .................. G06F 9/4856 |

FOREIGN PATENT DOCUMENTS

CN    108268299 A    7/2018

\* cited by examiner

*Primary Examiner* — Idriss N Alrobaye
*Assistant Examiner* — Sakhr A Aldaylam
(74) *Attorney, Agent, or Firm* — Kim & Stewart LLP

(57) ABSTRACT

Data storage of workloads is migrated from a local computing environment to a cloud computing environment. The workloads are first executed in a runtime environment that have been deployed within a first virtual machine running in the local computing environment, according to a blueprint that defines a data storage path for the workloads. The data storage of the workloads is migrated by copying contents of a first file, which corresponds to a virtual disk of the first virtual machine, to a second file, modifying the blueprint to change the data storage path to a path that specifies a file path to the second file, and deploying a runtime environment within a second virtual machine running in the cloud computing environment, according to the modified blueprint. After transitioning the data storage of the workloads in this manner, the workloads are executed in the runtime environment deployed within the second virtual machine.

12 Claims, 5 Drawing Sheets

US 11,106,380 B2

MIGRATION OF STORAGE FOR WORKLOADS BETWEEN DESKTOP AND CLOUD ENVIRONMENTS

BACKGROUND

Kubernetes® (commonly stylized as k8s) is becoming more common in industries for automating application deployment, scaling, and management. Kubernetes workloads generally run in a cloud environment, but many users tend to initially run the workloads locally on a desktop, and then upload the workloads to the cloud environment. However, the transition of the workloads between local and cloud environments is currently difficult to achieve because of differences in storage devices used in the two environments.

SUMMARY

According to one or more embodiments, data storage of workloads is migrated from a local computing environment (e.g., desktop) to a cloud computing environment. The workloads are first executed in a runtime environment (e.g., Kubernetes runtime environment) that have been deployed within a first virtual machine running in the local computing environment, according to a blueprint that defines a data storage path for the workloads. The data storage of the workloads is migrated by copying contents of a first file, which corresponds to a virtual disk of the first virtual machine, to a second file, modifying the blueprint to change the data storage path to a path that specifies a file path to the second file, and deploying a runtime environment within a second virtual machine running in the cloud computing environment, according to the modified blueprint. After transitioning the data storage of the workloads in this manner, the workloads are executed in the runtime environment deployed within the second virtual machine.

Further embodiments include, without limitation, a non-transitory computer-readable storage medium that includes instructions for a processor to carry out the above method, and a computer system that includes a processor programmed to carry out the above method.

DETAILED DESCRIPTION

Figure 1:
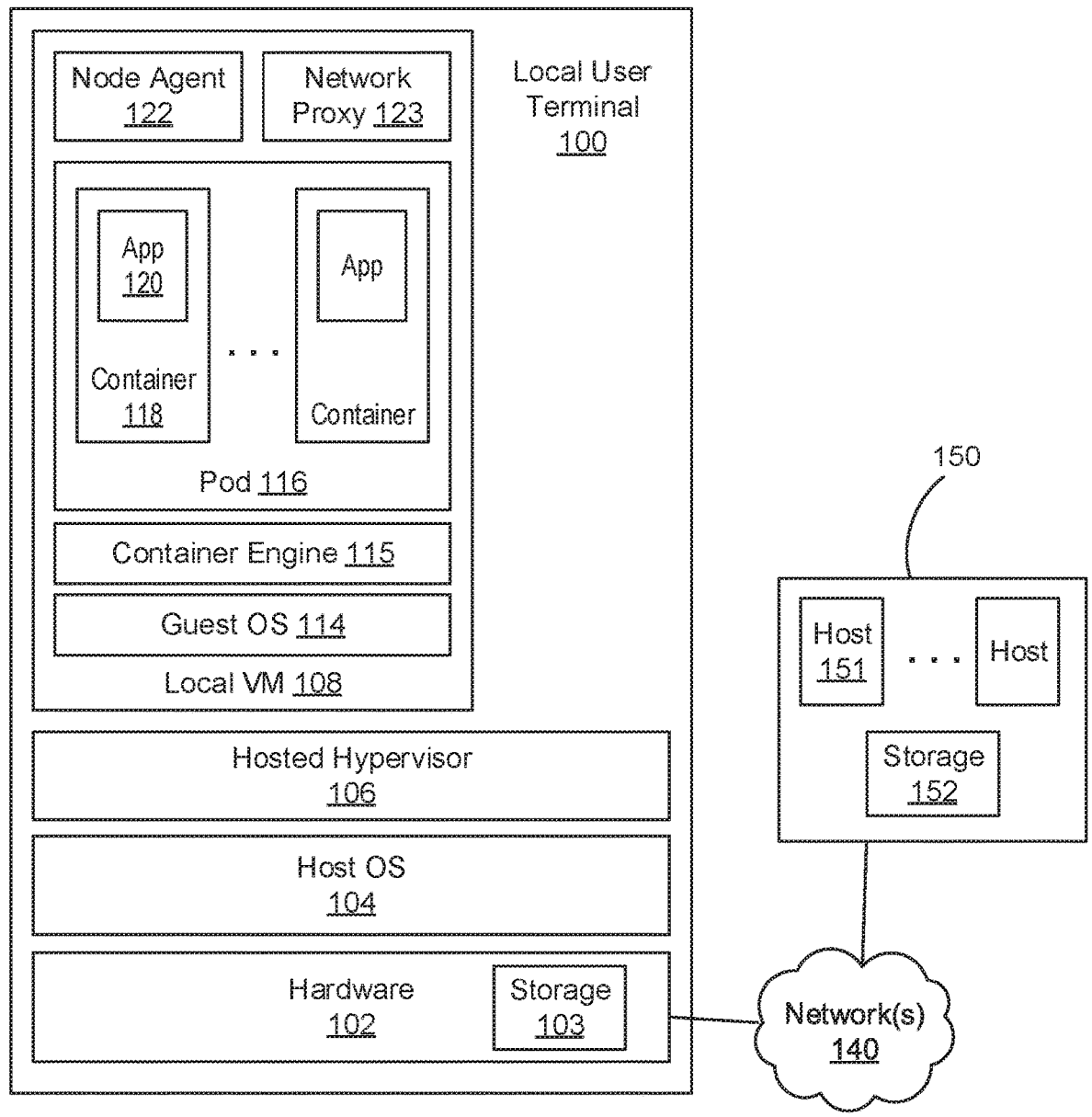
FIG. 1 illustrates a local user terminal at which a Kubernetes workload is executed and from which data storage of the Kubernetes workload is migrated to a cloud computing environment according to one or more embodiments.

FIG. 1 illustrates a local user terminal 100 (more generally referred to as a local computing environment) in which a Kubernetes workload is executed and from which data storage of the Kubernetes workload is migrated to a cloud computing environment 150 according to one or more embodiments. As depicted in FIG. 1, local user terminal 100 (e.g., a notebook, laptop, or desktop computer) includes a hardware platform (hardware) 102, which contains conventional components of a computer system including a processor (not shown), RAM (not shown), and storage 103, e.g., hard disk drive or solid state drive, a host operating system (OS) 104, and a hosted hypervisor 106, which supports an execution space in which local VM 108 runs. One or more local VMs may be instantiated in the execution space supported by hosted hypervisor 106 but only one is shown to simplify the description. In one embodiment, hosted hypervisor 106 provisions a virtual disk for local VM 108 as a virtual disk image file (e.g., VMDK file) in storage 103, such that all input/output (I/O) operations issued by local VM 108 to its virtual disk are processed as file I/O operations performed on the virtual disk image file.

Local VM 108 includes a guest OS 114 and a container runtime environment provisioned by a container engine 115, which is running on top of guest OS 114. As depicted in FIG. 1, a plurality of containers are deployed in the container runtime environment, and an application is running in each container. For example, application 120 is running in container 118. In each node of a Kubernetes cluster, a plurality of containers are managed as a single unit, e.g., a pod 116, by a kubelet, which is depicted more generally in FIG. 1 as a node agent 122. FIG. 1 also depicts network proxy 123, which is a network proxy (e.g., kube-proxy) that runs on each node of the Kubernetes cluster to enable network communication to and from a pod of that node, e.g., pod 116.

Local user terminal 100 communicates with cloud computing environment 150 via a network 140. Cloud computing environment 150 includes a plurality of hosts, which are physical servers hosting virtual machines, and a storage 152 that is accessible by the hosts. Storage 152 may be any one of a storage array connected to the hosts through a storage area network (SAN), network-attached storage, or a virtual SAN.

Figure 2:
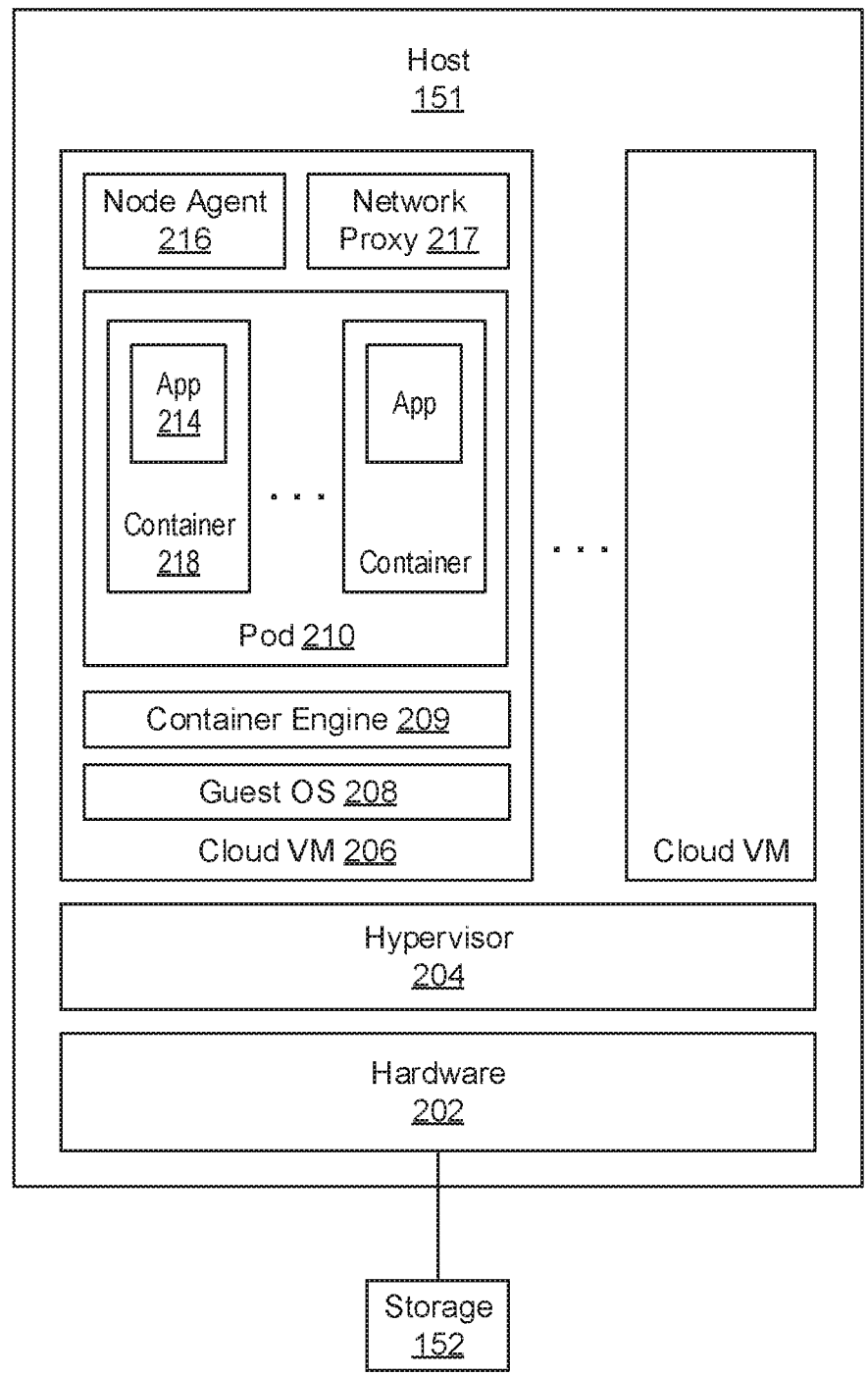
FIG. 2 illustrates in more detail one host in the cloud computing environment that is configured with virtual machines in which Kubernetes workloads are executed.

FIG. 2 illustrates in more detail host 151 that is configured with virtual machines in which Kubernetes workloads are executed. As depicted in FIG. 2, host 151 includes a hardware platform (hardware) 202, which contains conventional components of a computer system including a storage interface (e.g., host bus adapter) or a network interface (e.g., network interface controller) through which I/O operations are transmitted to storage 152. Host 151 further includes a hypervisor 204 (more generally referred to as virtualization software), which supports an execution space in which cloud VMs are instantiated.

A Kubernetes cluster typically includes multiple nodes. FIG. 2 depicts just one node of the Kubernetes cluster deployed in cloud VM 206. Cloud VM 206 includes a guest OS 208 and a container runtime environment provisioned by a container engine 209, which is running on top of guest OS 208. As depicted in FIG. 2, a plurality of containers are deployed in the container runtime environment, and an application is running in each container. For example, application 214 is running in container 218. Also executing in cloud VM 206 is a node agent 216 which manages all of the containers in pod 210 as a single unit. In addition, network proxy 217 enables network communication to and from pod 210.

Figure 3:
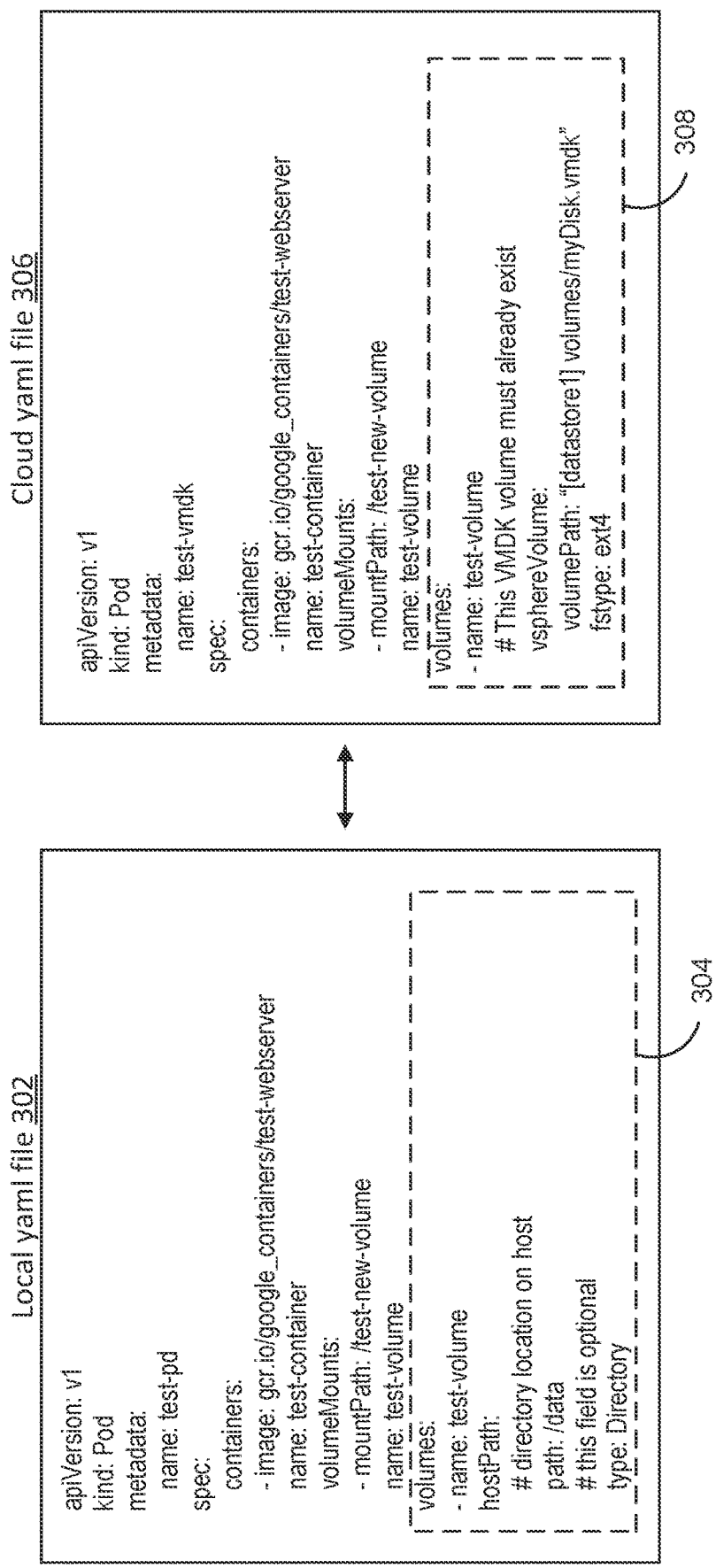
FIG. 3 illustrates an example of a blueprint used to provision a Kubernetes cluster at the local user terminal and a blueprint used to provision a Kubernetes cluster in the virtual machines running in the cloud computing environment.

FIG. 3 illustrates an example of a blueprint used to provision a Kubernetes cluster at local user terminal 100 and a blueprint used to provision a Kubernetes cluster in the virtual machines running in cloud computing environment 150. The blueprint used to provision a Kubernetes cluster typically is configured as a yaml file.

A local yaml file 302 is the blueprint used to provision a Kubernetes cluster at local user terminal 100. It is an example of a yaml file associated with pod 116 provisioned in local user terminal 100. Local yaml file 302 defines a data storage path 304 for pod 116. In particular, data storage path 304 includes "hostPath" which indicates the path to a file or directory in a file system managed by host OS 104 in FIG. 2.

A cloud yaml file 306 is the blueprint used to provision a Kubernetes cluster in the virtual machines running in cloud computing environment 150. It is an example of a yaml file associated with pod 210 provisioned in cloud VM 206. Cloud yaml file 306 defines a data storage path 308 for pod 201. In particular, data storage path 308 includes "volumePath" which indicates the path to a file or directory in a file system managed hypervisor 204 in FIG. 3.

Figure 4:
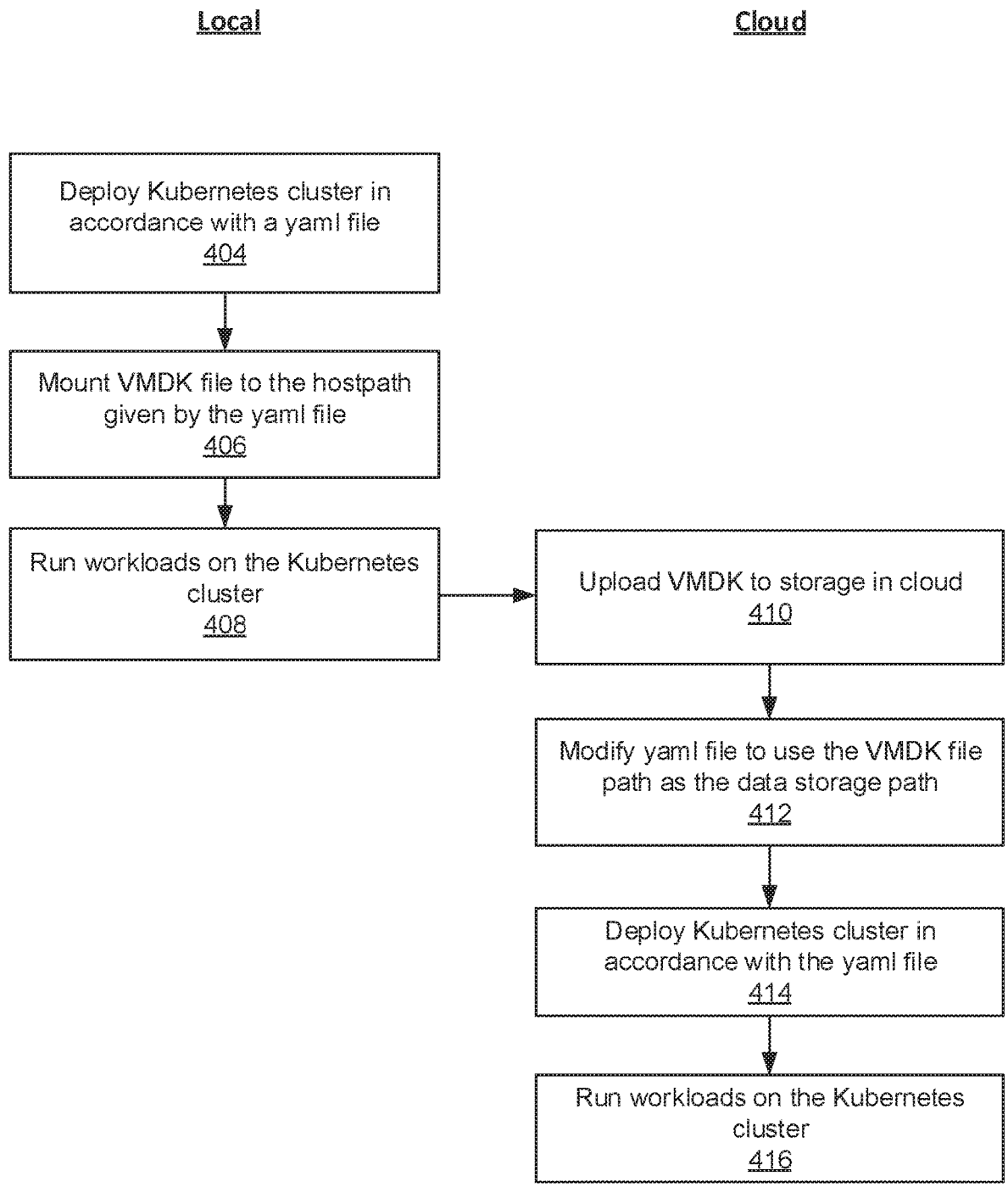
FIG. 4 is a flowchart of a method for switching a Kubernetes context from a local computing environment to the cloud computing environment.

FIG. 4 is a flowchart of a method for switching a Kubernetes context from local user terminal 100 to cloud computing environment 150, and the method illustrates how a data storage of workloads executed in a local computing environment is migrated to a cloud computing environment.

The method begins in step 404, where a user executes an installation script within local VM 108 to deploy a Kubernetes cluster in accordance with a yaml file (see, e.g., local yaml file 302 in FIG. 3). For example, the deployed Kubernetes cluster may be a single-node Kubernetes cluster with pod 116, node agent 122, and network proxy 123 depicted in FIG. 1. Then, in step 406, the installation script mounts the VMDK file, which is currently stored in storage 103 and backing the virtual disk of local VM 108, to the "hostPath" given by the yaml file. Hereafter, all of the I/O operations generated as workloads are run in the deployed Kubernetes cluster (step 408) are issued to the virtual disk of the local VM 108 and converted to file operations performed on the VMDK file by host OS 104.

The arrow from 408 to 410 represents a switch in context Kubernetes context from local user terminal 100 to cloud computing environment 150, and a handoff of the yaml file from local user terminal 100 to cloud computing environment 150. That is, the user now wants to run workloads in a Kubernetes cluster that is deployed in cloud computing environment 150. For example, the Kubernetes cluster deployed in cloud computing environment 150 may be a single-node Kubernetes cluster with pod 210, node agent 216, and network proxy 217 depicted in FIG. 2. To switch the context, the user runs a storage migration script on a cloud platform management server (not shown). The storage migration script in step 410 uploads the VMDK file stored in storage 103 to storage 152. Then, in step 412, the storage migration script modifies the yaml file to include a "volumePath" (see, e.g., cloud yaml file 306 in FIG. 3) and sets the path to the uploaded VMDK file to be the "volumePath" in the yaml file. In step 414, the storage migration script deploys a Kubernetes cluster in accordance with the yaml file. Hereafter, all of the I/O operations generated as workloads are run in the deployed Kubernetes cluster (step 416) are issued to the virtual disk of cloud VM 206 and converted to file operations performed on the uploaded VMDK file by hypervisor 204.

Figure 5:
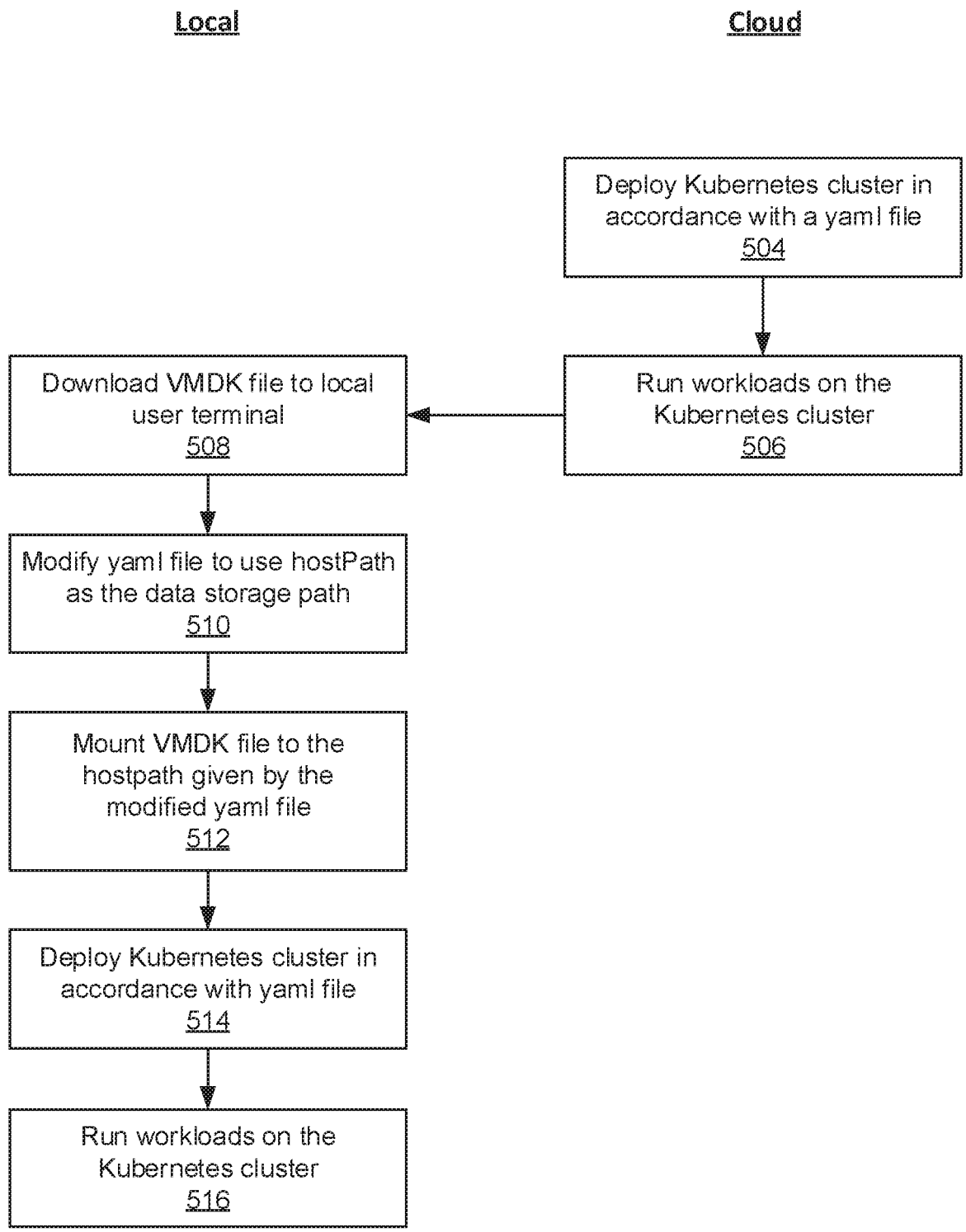
FIG. 5 is a flowchart of a method for switching a Kubernetes context from the cloud computing environment to the local computing environment.

FIG. 5 is a flowchart of a method for switching a Kubernetes context from cloud computing environment 150 to local user terminal 100, and the method illustrates how a data storage of workloads executed in a cloud computing environment is migrated to a local computing environment.

The method begins in step 504, where the user executes an installation script on the cloud platform management server to deploy a Kubernetes cluster in accordance with a yaml file (see, e.g., cloud yaml file 308 in FIG. 3). For example, the deployed Kubernetes cluster may be a single-node Kubernetes cluster with pod 210, node agent 216, and network proxy 217 depicted in FIG. 2. Hereafter, all of the I/O operations generated as workloads are run in the deployed Kubernetes cluster (step 506) are issued to the virtual disk of cloud VM 206 and converted to file operations performed on the VMDK file by hypervisor 204.

The arrow from 506 to 508 represents a switch in context Kubernetes context from cloud computing environment 150 to local user terminal 100, and a handoff of the yaml file from cloud computing environment 150 to local user terminal 100. That is, the user now wants to run workloads in a Kubernetes cluster that is to be deployed in local user terminal 100. To switch the context, the user runs a storage migration script in local VM 108. The storage migration script in step 508 downloads the VMDK file stored in storage 152 to storage 103. Then, in step 510, the storage migration script modifies the yaml file to include a "hostPath" (see, e.g., local yaml file 302 in FIG. 3) and sets the path to the downloaded VMDK file to be the "hostPath" in the yaml file. In step 512, the storage migration script mounts the downloaded VMDK file to be the virtual disk of local VM 108. Then, in step 514, the storage migration script deploys a Kubernetes cluster in accordance with the yaml file. Hereafter, all of the I/O operations generated as workloads are run in the deployed Kubernetes cluster (step 516) are issued to the virtual disk of the local VM 108 and converted to file operations performed on the downloaded VMDK file by host OS 104.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method of transitioning data storage of workloads from a local computing environment to a cloud computing environment, wherein the workloads are executed in a runtime environment that have been deployed within a first virtual machine running in the local computing environment, according to a blueprint, wherein a data storage path for the workloads is defined in the blueprint, said method comprising:
   copying contents of a first file, which is stored in the local computing environment and includes a first virtual disk of the first virtual machine, to a second file, which is stored in the cloud computing environment and includes a second virtual disk of a second virtual machine running in the cloud computing environment;
   modifying, at the cloud computing environment, the blueprint to change the data storage path to a path that specifies a file path to the second file in the cloud computing environment; and
   deploying a runtime environment within a second virtual machine running in the cloud computing environment, according to the modified blueprint.

2. The method of claim 1, wherein the runtime environment deployed within the second virtual machine is the same type of runtime environment deployed within the first virtual machine.

3. The method of claim 2, wherein the runtime environment deployed within the first virtual machine and the runtime environment deployed within the second virtual machine are each a Kubernetes runtime environment.

4. The method of claim 1, wherein the contents of the first file are read from a first storage device provisioned in the local computing environment and copied into the second file, which is stored in a second storage device provisioned in the cloud computing environment.

5. A method of transitioning data storage of workloads from a cloud computing environment to a local computing environment, wherein the workloads are executed in a runtime environment that have been deployed within a first virtual machine running in the cloud computing environment, according to a blueprint, wherein a data storage path for the workloads is defined in the blueprint, said method comprising:
   copying contents of a first file, which is stored in the cloud computing environment and includes a first virtual disk of the first virtual machine, to a second file, which is stored in the local computing environment and includes a second virtual disk of a second virtual machine running in the local computing environment;
   modifying, at the local computing environment, the blueprint to change the data storage path from a first path, which specifies a file path to the first file, to a second path;
   mounting the second file to the second path; and
   deploying a runtime environment within a second virtual machine running in the local computing environment, according to the modified blueprint.

6. The method of claim 5, wherein the runtime environment deployed within the second virtual machine is the same type of runtime environment deployed within the first virtual machine.

7. The method of claim 6, wherein the runtime environment deployed within the first virtual machine and the runtime environment deployed within the second virtual machine are each a Kubernetes runtime environment.

8. The method of claim 5, wherein the contents of the first file are read from a first storage device provisioned in the cloud computing environment and copied into the second file, which is stored in a second storage device provisioned in the local computing environment.

9. A cloud computing system connected via a desktop computing system via a network, wherein workloads are executed in a runtime environment that have been deployed within a first virtual machine running in the desktop computing system, according to a blueprint, wherein a data storage path for the workloads is defined in the blueprint, wherein a management server of the cloud computing system executes instructions stored in a non-transitory computer readable medium to carry out a method of transitioning data storage of the workloads from the desktop computing system to the cloud computing system, said method comprising:
   copying contents of a first file, which is stored in the desktop computing system and includes a first virtual disk of the first virtual machine, to a second file, which is stored in the cloud computing environment and includes a second virtual disk of a second virtual machine running in the cloud computing system;

modifying, at the management server, the blueprint to change the data storage path to a path that specifies a file path to the second file; and deploying a runtime environment within a second virtual machine running in the cloud computing system, according to the modified blueprint.

10. The cloud computing system of claim 9, wherein the runtime environment deployed within the second virtual machine is the same type of runtime environment deployed within the first virtual machine.

11. The cloud computing system of claim 10, wherein the runtime environment deployed within the first virtual machine and the runtime environment deployed within the second virtual machine are each a Kubernetes runtime environment.

12. The cloud computing system of claim 9, wherein the contents of the first file are read from a first storage device provisioned in the desktop computing system and copied into the second file, which is stored in a second storage device provisioned in the cloud computing system.

* * * * *